(12) United States Patent
Yaffe

(10) Patent No.: US 10,399,630 B2
(45) Date of Patent: Sep. 3, 2019

(54) MOTORCYCLE FAIRING ADJUSTMENT MEMBER AND ASSEMBLY AND METHOD OF ADJUSTING A MOTORCYCLE FAIRING

(71) Applicant: Paul Yaffe, Phoenix, AZ (US)

(72) Inventor: Paul Yaffe, Phoenix, AZ (US)

(*) Notice: Subject to any disclaimer, the term of this patent is extended or adjusted under 35 U.S.C. 154(b) by 37 days.

(21) Appl. No.: 15/483,677

(22) Filed: Apr. 10, 2017

(65) Prior Publication Data

US 2017/0274954 A1 Sep. 28, 2017

Related U.S. Application Data

(63) Continuation-in-part of application No. 14/796,391, filed on Jul. 10, 2015, now Pat. No. 9,616,957.

(51) Int. Cl.
*B62J 17/04* (2006.01)
*B62J 17/02* (2006.01)

(52) U.S. Cl.
CPC .............. *B62J 17/04* (2013.01); *B62J 17/02* (2013.01)

(58) Field of Classification Search
CPC ... B60J 17/04; B60J 17/02; B62J 17/04; B62J 17/02

USPC ........................................................ 296/78.1
See application file for complete search history.

(56) References Cited

U.S. PATENT DOCUMENTS

| | | | | |
|---|---|---|---|---|
| 5,788,313 A | * | 8/1998 | Willey | ..................... B62J 17/04 296/78.1 |
| 2006/0087143 A1 | * | 4/2006 | Willey | ..................... B62J 11/00 296/78.1 |
| 2009/0079219 A1 | * | 3/2009 | Caprio | ........................ B60J 1/06 296/78.1 |

* cited by examiner

*Primary Examiner* — Joseph D. Pape
(74) *Attorney, Agent, or Firm* — Ice Miller LLP

(57) ABSTRACT

A motorcycle fairing adjustment member and assembly and method of adjusting a motorcycle fairing are provided. The motorcycle fairing adjustment member includes at least one first bracket attachment point configured for attachment of the fairing adjustment member to the fairing bracket, at least one fairing attachment point configured for attachment of the inner fairing member of the motorcycle to the fairing adjustment member, and an adjustment distance formed by the at least one first bracket attachment point and the at least one fairing attachment point.

16 Claims, 15 Drawing Sheets

MOTORCYCLE FAIRING ADJUSTMENT MEMBER AND ASSEMBLY AND METHOD OF ADJUSTING A MOTORCYCLE FAIRING

RELATED APPLICATION DATA

This application is a continuation-in-part of and claims the benefit to U.S. patent application Ser. No. 14/796,391, filed Jul. 10, 2015, which is hereby incorporated by reference in its entirety.

BACKGROUND

Some motorcycles include a front fairing assembly located near a top portion of the front fork assembly. The front fairing assembly may include one or more headlamps, turn signals, gauges, or other instrumentation, or one or more mirrors, or a combination thereof. A front fairing assembly may have an undesirable vertical position relative to the rider, the motorcycle frame, or any other motorcycle component. Such positioning of the front fairing assembly may adversely affect aerodynamic drag or lift of the motorcycle, motorcycle operator or passenger ergonomics and/or safety, and/or the aesthetic appearance of the motorcycle.

Therefore, there exists a need for a motorcycle fairing adjustment member, a motorcycle fairing adjustment assembly, and a method of adjusting a motorcycle fairing that conveniently and reversibly reduces aerodynamic drag and/or lift, and improves the ergonomics, safety, and aesthetic appearance of the motorcycle.

SUMMARY

In accordance with an embodiment of the present disclosure, a motorcycle fairing adjustment assembly is provided. The motorcycle fairing adjustment assembly includes a fairing bracket extending longitudinally forward from a neck portion of a motorcycle frame, an inner fairing member disposed adjacent to the fairing bracket, and a fairing adjustment member disposed between the fairing bracket and the inner fairing member. The fairing adjustment member comprises an inner side and an outer side forming an adjustment angle adjusting an angle of the inner fairing member relative to the fairing bracket.

In accordance with an additional embodiment of the present disclosure, a motorcycle fairing adjustment member is provided. The motorcycle fairing adjustment member includes an outer side configured for mounting to an inner fairing member of a motorcycle, an inner side configured for mounting to a fairing bracket extending longitudinally forward from a neck portion of a motorcycle frame, and an adjustment angle formed by the outer side and the inner side. The adjustment angle adjusts an angle of the inner fairing member relative to the fairing bracket.

In accordance with an additional embodiment of the present disclosure, a method of adjusting a motorcycle fairing is provided. The method includes providing a fairing adjustment member having an outer side and an inner side forming an adjustment angle, providing a fairing bracket extending longitudinally forward from a neck portion of a motorcycle frame and having a fairing bracket outer surface, providing an inner fairing member having an inner fairing member inner surface, coupling the fairing adjustment member to the fairing bracket at the fairing bracket outer surface, and coupling the inner fairing member to the fairing adjustment member at the inner fairing member inner surface such that an angle between the inner fairing member inner surface and the fairing bracket outer surface corresponds to the adjustment angle of the fairing adjustment member.

In accordance with an additional embodiment of the present disclosure, a motorcycle fairing adjustment assembly is provided. The assembly includes a fairing bracket extending longitudinally forward from a neck portion of a motorcycle frame, an inner fairing member disposed adjacent to the fairing bracket, and a fairing adjustment member disposed between the fairing bracket and the inner fairing member, wherein the fairing adjustment member comprises at least one first bracket attachment point and at least one fairing attachment point forming an adjustment distance adjusting a vertical position of the inner fairing member relative to the fairing bracket.

In accordance with an additional embodiment of the present disclosure, a motorcycle fairing adjustment member is provided. The member includes an outer side configured for mounting to an inner fairing member of a motorcycle, an inner side configured for mounting to a fairing bracket extending longitudinally forward from a neck portion of a motorcycle frame; at least one first bracket attachment point configured for attachment of the fairing adjustment member to the fairing bracket, at least one fairing attachment point configured for attachment of the inner fairing member of the motorcycle to the fairing adjustment member, and an adjustment distance formed by the at least one first bracket attachment point and the at least one fairing attachment point, wherein the adjustment distance adjusts a vertical position of the inner fairing member relative to the fairing bracket.

In accordance with an additional embodiment of the present disclosure, a method of adjusting a motorcycle fairing is provided. The method includes providing a fairing adjustment member having at least one first bracket attachment point and at least one fairing attachment point forming an adjustment distance, providing a fairing bracket having a fairing bracket outer surface and extending longitudinally forward from a neck portion of a motorcycle frame, providing an inner fairing member having an inner fairing member inner surface, coupling the fairing adjustment member to the fairing bracket at the at least one first bracket attachment point, and coupling the inner fairing member to the fairing adjustment member at the at least one fairing attachment point such that an adjustment distance is formed by the at least one first bracket attachment point and the at least one fairing attachment point corresponding to a vertical adjustment of the inner fairing member relative to the fairing bracket.

BRIEF DESCRIPTION OF THE FIGURES

The embodiments described herein and other features, advantages, and disclosures contained herein, and the manner of attaining them, will be better understood from the following description in conjunction with the accompanying drawing figures, in which like reference numerals identify like elements, and wherein.

DETAILED DESCRIPTION

In the following detailed description of embodiments of the present disclosure, reference is made to the accompanying drawings that form a part hereof, and in which is shown by way of illustration, and not by way of limitation, such specific embodiments. It is to be understood that other embodiments may be utilized and that changes may be made without departing from the spirit and scope of the present disclosure.

Figure 1:
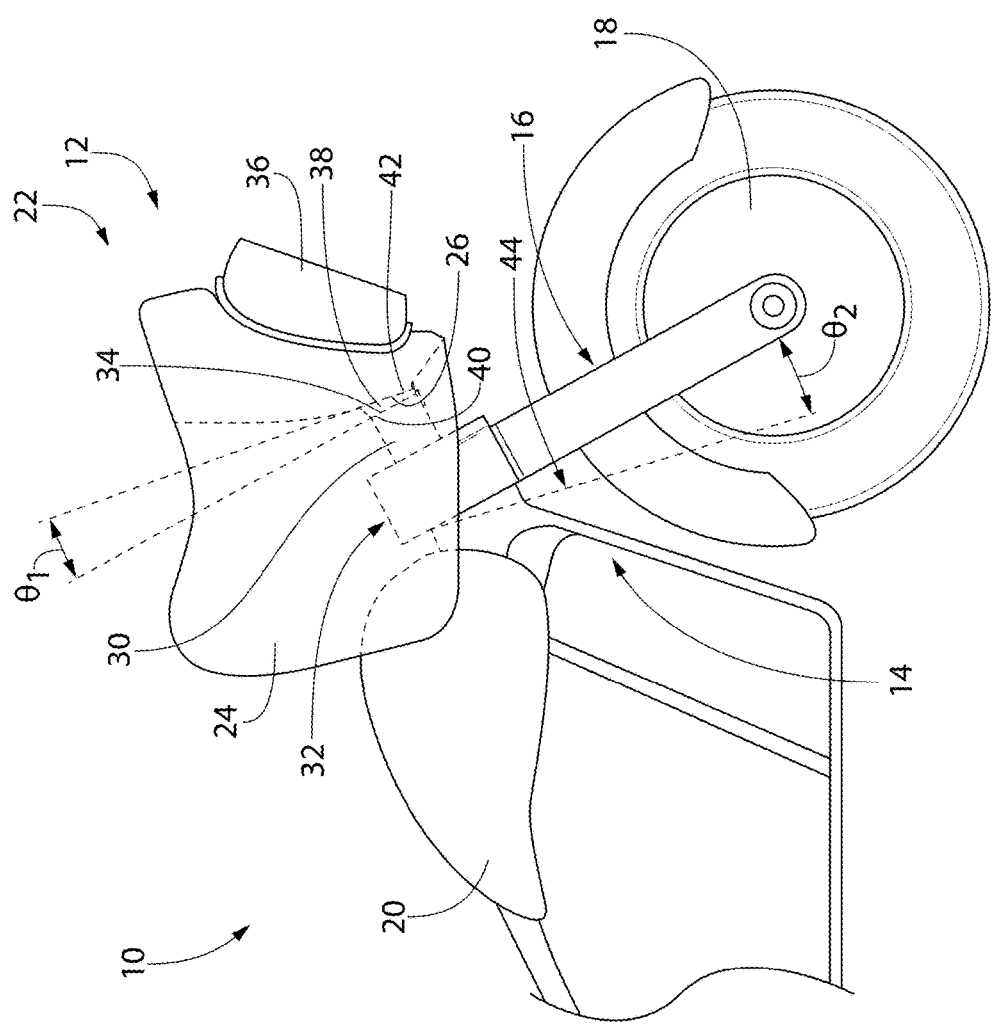
FIG. 1 is a side elevation view of a front portion of a motorcycle having a fairing adjustment assembly in accordance with aspects of the present disclosure.
Figure 2:
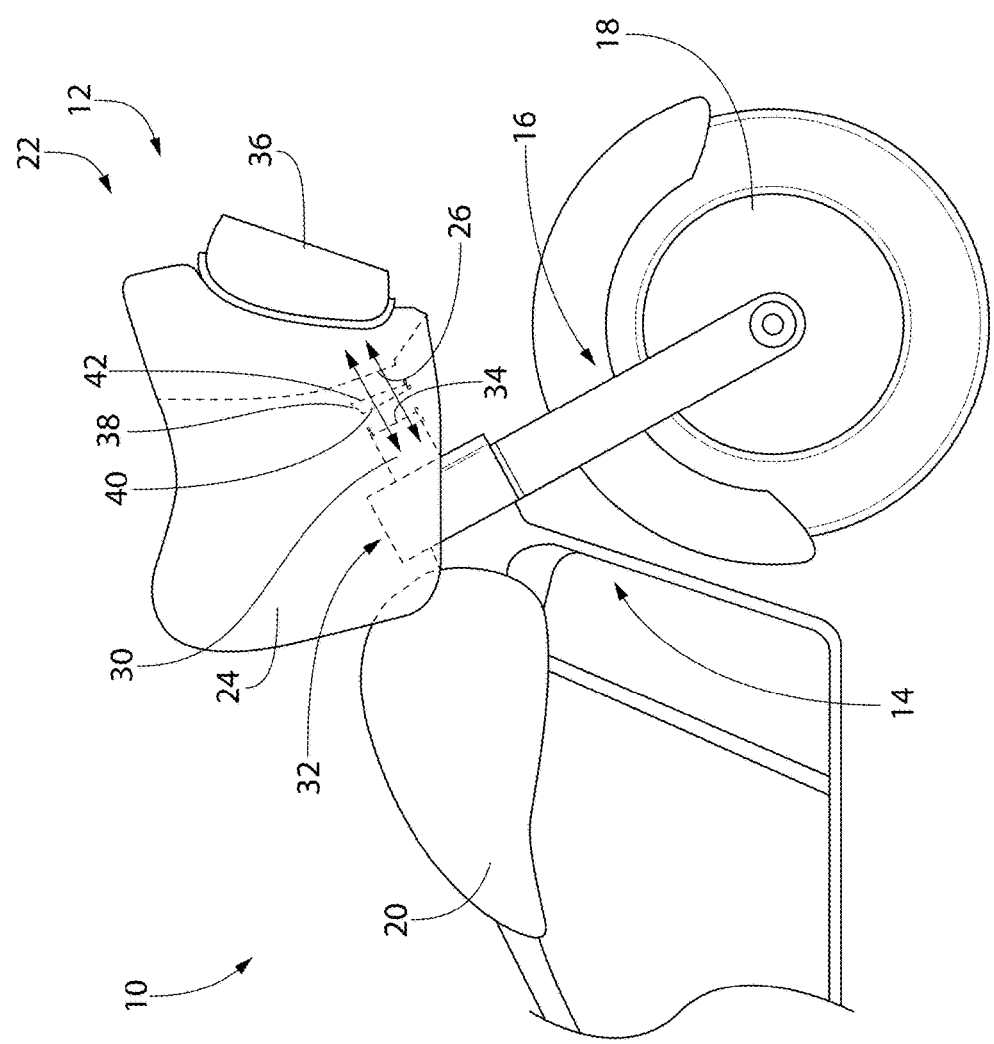
FIG. 2 is a partially exploded side elevation view of a motorcycle having a fairing adjustment assembly in accordance with aspects of the present disclosure.
Figure 3:
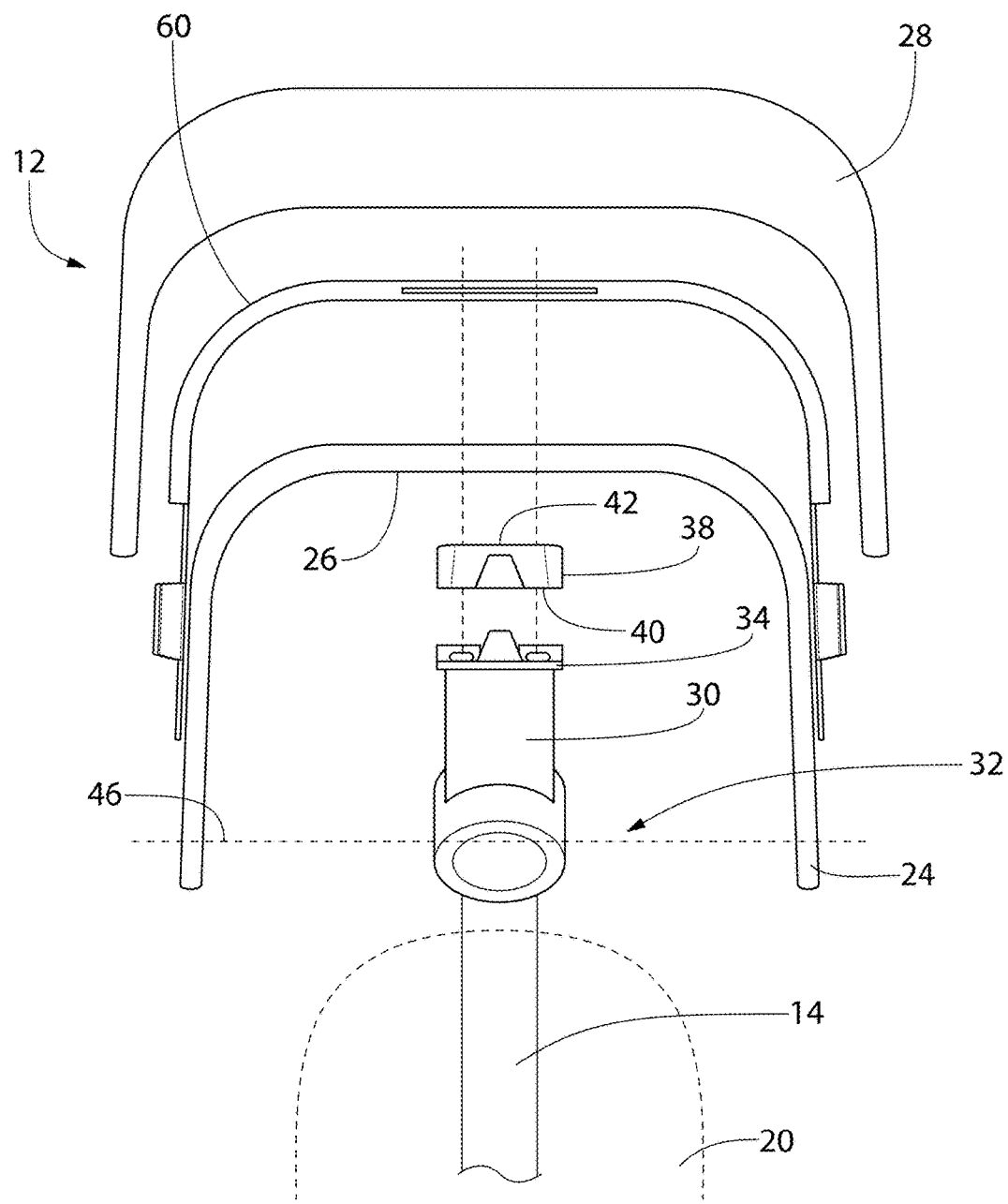
FIG. 3 is a top partially exploded view of a motorcycle having a fairing adjustment assembly in accordance with aspects of the present disclosure.

Referring now to FIGS. 1-3, a motorcycle fairing adjustment assembly 12 is shown. The front portion of a motorcycle 10 includes a frame 14, a fork assembly 16, a front wheel 18, a fuel tank 20, and a motorcycle fairing 22. The motorcycle fairing 22 includes an inner fairing member 24 with an inner fairing member inner surface 26 in the embodiment shown. The motorcycle fairing 22 of an embodiment further includes an outer fairing member 28, as illustrated in FIG. 3. Although the present disclosure describes an inner fairing member 24 and an outer fairing member 28, the existence of an inner fairing member does not require the existence of an outer fairing member and the existence of an outer fairing member does not require the existence of an inner fairing member. A fairing bracket 30 is located at or adjacent to a neck portion 32 of the frame 14 in an embodiment. The fairing bracket 30 includes a fairing bracket outer surface 34. The fairing adjustment assembly 12 of an embodiment includes one or more headlamps 36. In one or more embodiments, the fairing adjustment assembly 12 includes one or more gauges or other instrumentation (not shown), one or more turn signals (not shown), one or more mirrors (not shown), headlight(s) (not shown), and/or a windscreen (not shown). The fairing bracket 30 extends longitudinally forward from the neck portion 32 of the motorcycle frame 14 as shown in FIGS. 1-3. The inner fairing member 24 at least partially wraps around the fairing bracket 30 in the embodiment illustrated in FIG. 3. In another embodiment, the inner fairing member 24 extends longitudinally rearward to partially enclose and/or partially obscure the fairing bracket 30 and/or the neck portion 32 of the frame 14. In another embodiment, the inner fairing 24 is disposed adjacent to the fairing bracket 30 and/or the neck portion 32. The fairing adjustment assembly 12 further includes a fairing adjustment member 38 disposed between the fairing bracket 30 and the inner fairing member 24. The fairing adjustment member 38 of an embodiment is generally wedge-shaped. The fairing adjustment member 38 includes an inner side 40 and an outer side 42 forming an adjustment angle θ1. The adjustment angle θ1 adjusts an angle and/or position of the inner fairing member 24 relative to the motorcycle frame 14, neck portion 32, or fairing bracket 30. In one or more additional embodiments, the adjustment angle θ1 adjusts an angle and/or position of one or more of the outer fairing member 28, gauges or other instrumentation (not shown), one or more turn signals (not shown), one or more mirrors (not shown), headlight(s) (not shown), and/or a windscreen (not shown).

In an embodiment, a rake angle of the neck portion 32 is adjusted or modified to form a rake adjustment angle θ2 of the neck portion 32, as indicated in FIG. 1. The rake adjustment angle θ2 of the neck portion 32 refers to the difference between an adjusted or modified rake angle of the motorcycle frame 14 and the original rake angle of the motorcycle frame 14 before adjustment or modification. The rake adjustment angle θ2 of an embodiment corresponds with the adjustment angle θ1 of the fairing adjustment member 38. In an embodiment, a method of the present disclosure includes removing the neck portion 32 from the motorcycle frame 14. Such removal may include, without limitation, cutting the neck portion 32 off of the motorcycle frame 14. An unadjusted neck portion position 44 is illustrated in FIGS. 1 and 2 and refers to the position or angle of the neck portion 32 prior to adjustment or modification.

Referring again to FIG. 3, a fairing support member 60 forms part of the motorcycle 10 in an embodiment, as described in the patent application filed on the same date as the present application and entitled "Motorcycle Fairing Support Member and Assembly and Method of Supporting a Motorcycle Fairing" by inventor Paul Yaffe, which is hereby incorporated by reference in its entirety.

The method of an embodiment further includes coupling an adjusted neck portion 32 to the motorcycle frame 14. Such coupling of the adjusted neck portion 32 may include welding, fastening, adhering, or otherwise attaching the same neck portion 32 or a different or additional neck portion 32 to the motorcycle frame 14. The adjusted, different, or additional neck portion 32 includes the rake adjustment angle θ2 corresponding with the adjustment angle θ1 of the fairing adjustment member 38. In an embodiment, adjusting the rake angle of the neck portion 32 to form the rake adjustment angle θ2 comprises rotating the neck portion 32 about a lateral axis 46, as indicated in FIG. 3. The term "corresponding," as recited in the present disclosure, refers to being equal or substantially equal in one embodiment of the present disclosure and having the same angle within five degrees in either direction in another embodiment of the present disclosure.

In accordance with one or more embodiments of the present disclosure, the method further includes coupling the fairing adjustment member 38 to the fairing bracket 30 at the fairing bracket outer surface 34. The method of an embodiment further includes coupling the inner fairing member 24 to the fairing adjustment member 38 at the inner fairing member inner surface 26 such that an angle between the inner fairing member inner surface 26 and the fairing bracket outer surface 34 corresponds to the adjustment angle θ1 of the fairing adjustment member 38, as illustrated in FIGS. 1 and 2. The outer side 42 of the fairing adjustment member 38 is disposed against the inner fairing member inner surface 26, and the inner side 40 of the fairing adjustment member 38 is disposed against the fairing bracket outer surface 34 in an embodiment.

As shown in FIG. 3, an embodiment of the present disclosure includes a fairing support member 60 positioned adjacent the inner fairing member 24. The fairing support member 60 of an embodiment forms part of a fairing adjustment assembly 12 and includes a contour that substantially corresponds to one or more contours, dimensions, surfaces, or features of the inner fairing member 24 and/or the outer fairing member 28, as illustrated in FIG. 3.

Figure 4:
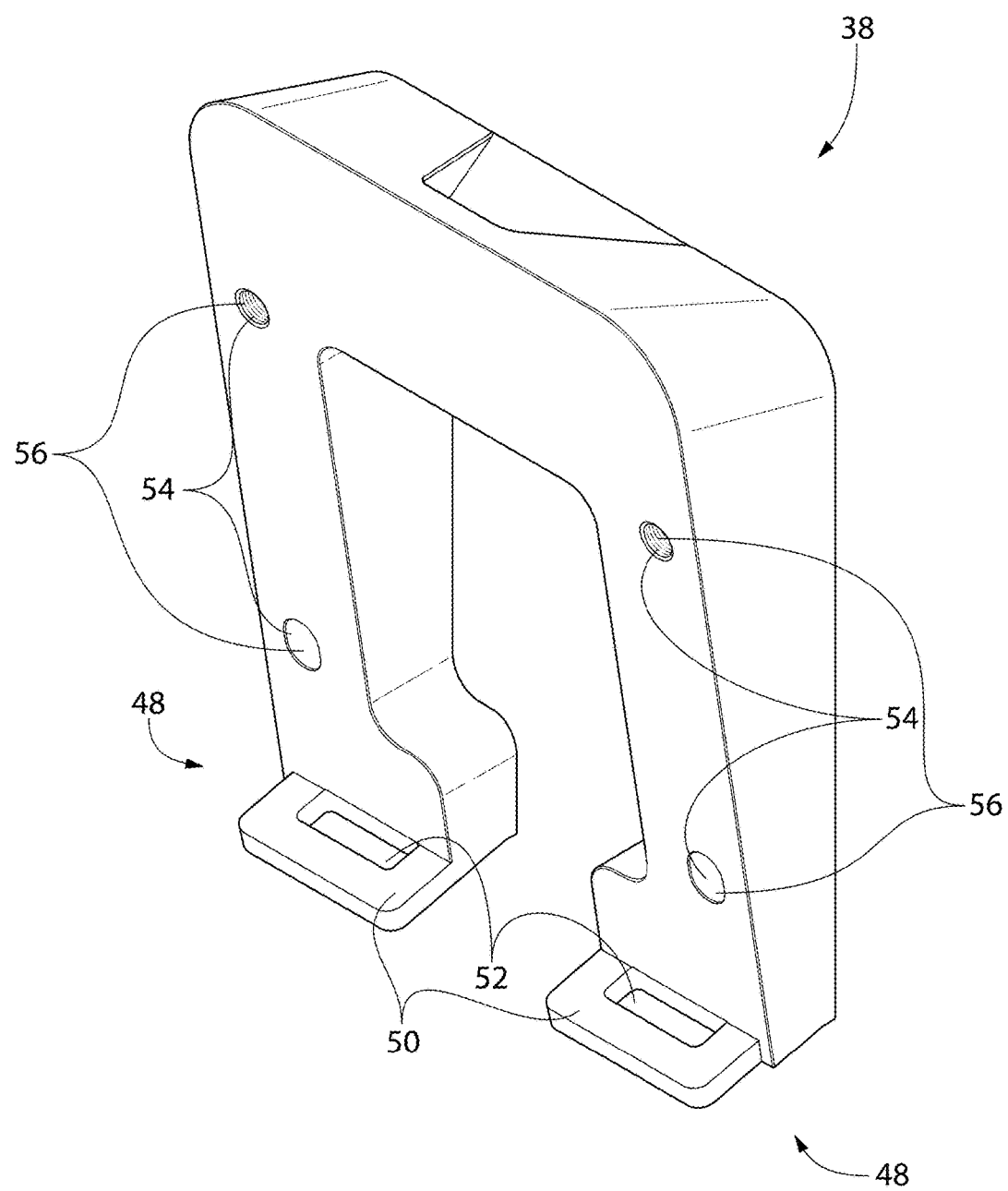
FIG. 4 is a perspective view of a fairing support member in accordance with aspects of the present disclosure.
Figure 5:
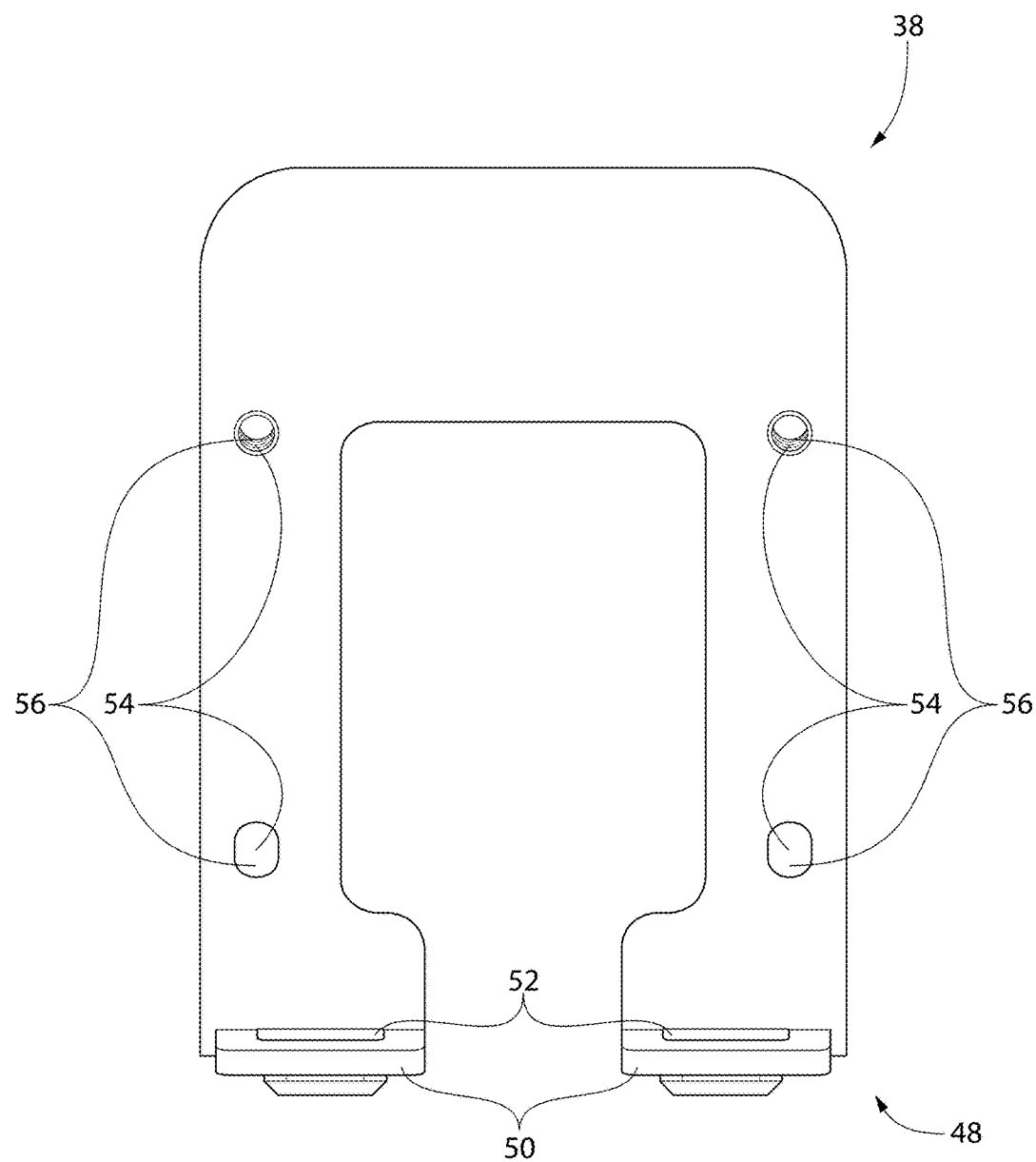
FIG. 5 is a front elevation view of a fairing support member in accordance with aspects of the present disclosure.
Figure 6:
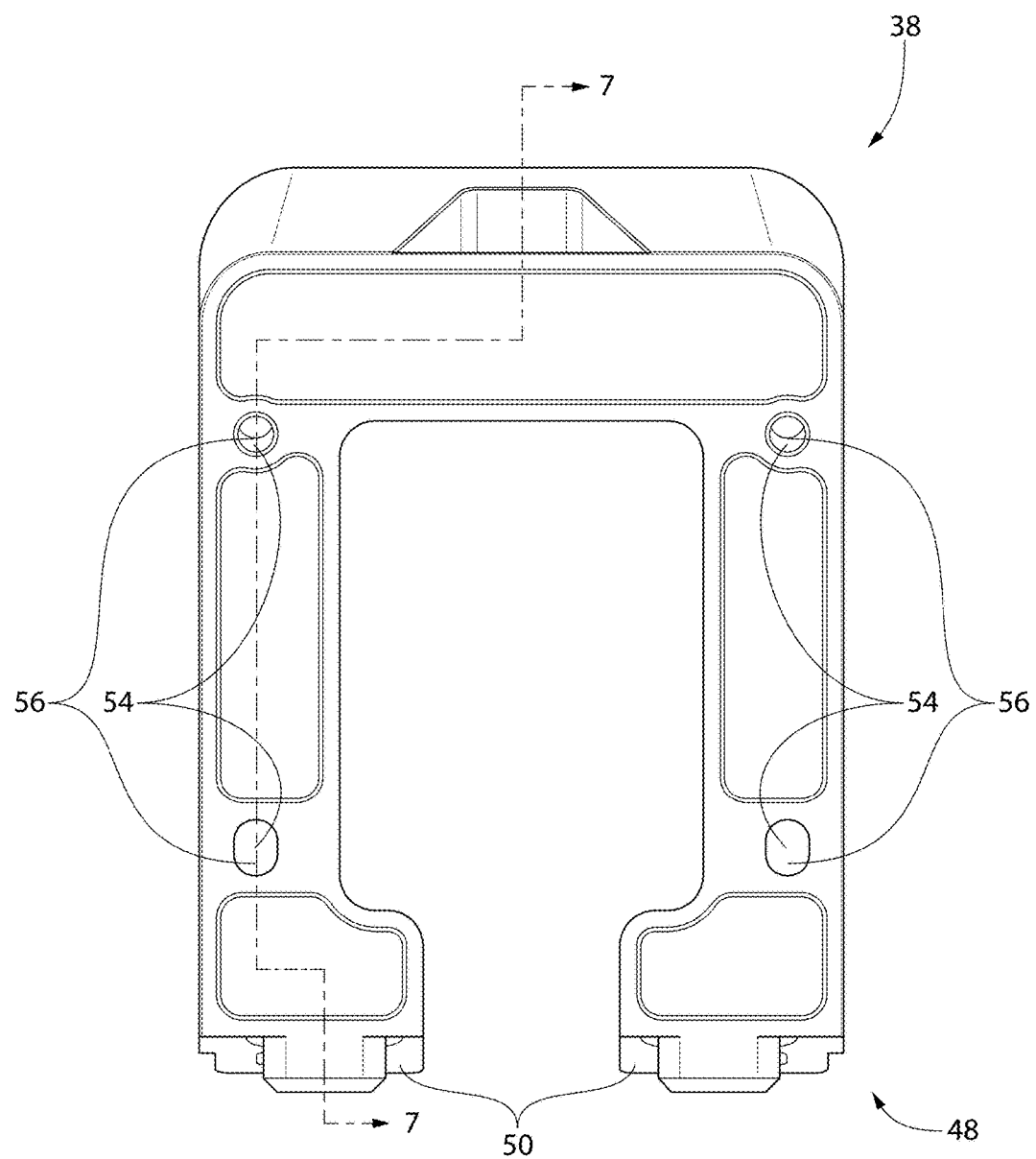
FIG. 6 is a rear elevation view of a fairing adjustment member in accordance with aspects of the present disclosure.
Figure 10:
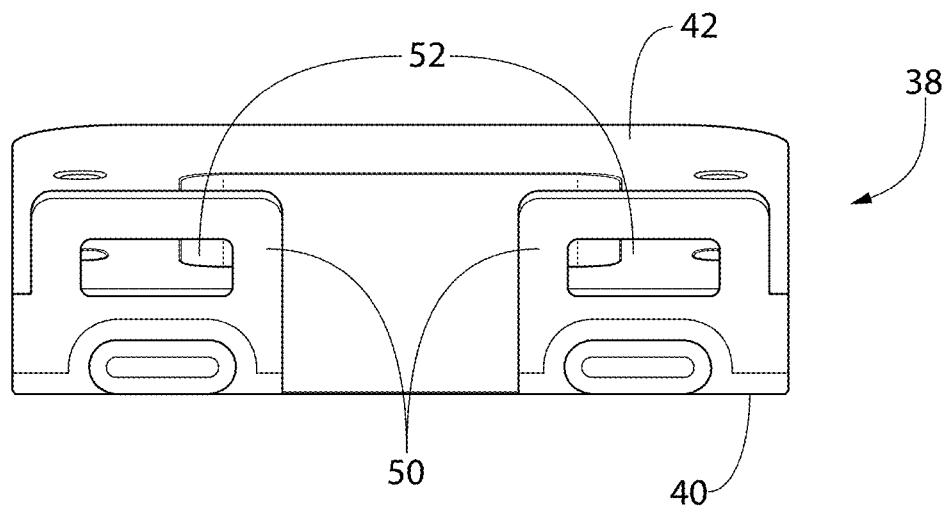
FIG. 10 is a bottom plan view of a fairing adjustment member in accordance with aspects of the present disclosure.

Referring now to FIGS. 4-10, the fairing adjustment member 38 of one or more embodiments is illustrated in detail. The fairing adjustment member 38 includes a lower support portion 48 providing vertical support for the inner fairing member 24. The lower support portion 48 includes a plurality of support members 50 extending longitudinally to provide vertical support for the inner fairing member 24. As illustrated in FIGS. 1 and 2, the support members 50 of the lower support portion 48 extend below the inner fairing member 24 of an embodiment. In an additional embodiment, the support members 50 include a plurality of depressions 52, as best shown in FIGS. 4 and 10, to enable positioning of the inner fairing member 24 relative to the fairing adjustment member 38. The plurality of depressions 52 includes one or more slots in an embodiment. The inner fairing member 24 of an embodiment includes protrusions (not shown) that fit into the depressions 52 for positioning and/or support.

Figures 7, 8:
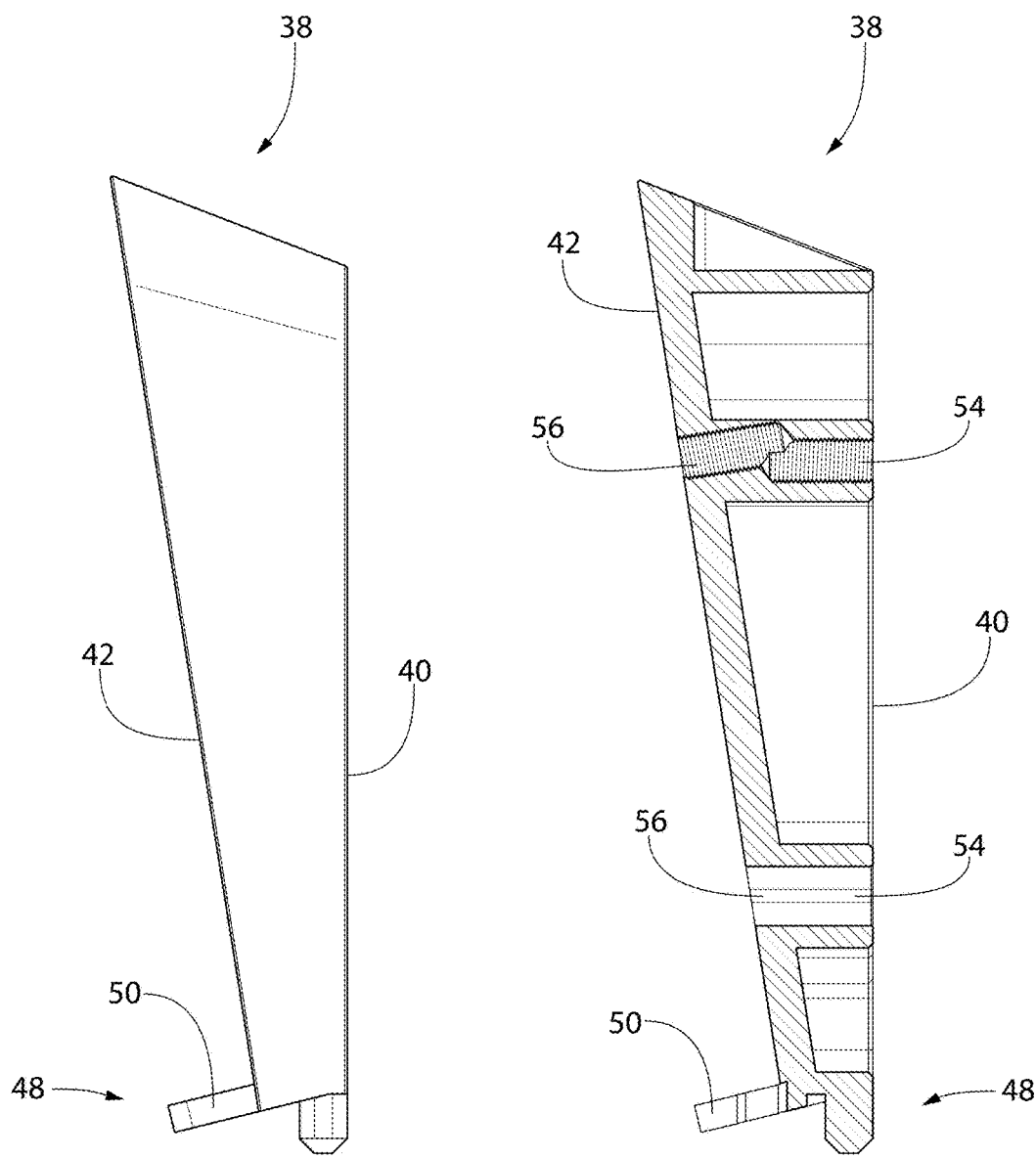
FIG. 7 is a side elevation view of a fairing adjustment member in accordance with aspects of the present disclosure.
FIG. 8 is a cross-sectional view of the fairing adjustment member depicted in FIG. 6 in accordance with aspects of the present disclosure.
Figure 9:
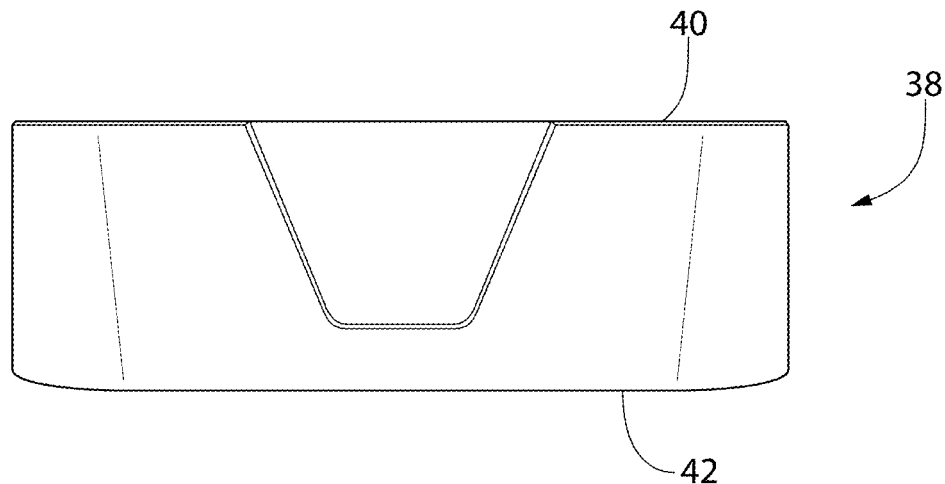
FIG. 9 is a top plan view of a fairing adjustment member in accordance with aspects of the present disclosure.

The fairing adjustment member 38 of an embodiment is coupled to the fairing bracket 30 with one or more fasteners (not shown) through one or more bracket fastener holes 54, as illustrated in FIG. 8. In one or more embodiments, the fairing adjustment member 38 is coupled to the fairing bracket 30 using other coupling means such as integral formation, welding, adhesives, or interference fitting. Additionally, the fairing adjustment member 38 of an embodiment is coupled to the inner fairing member 24 using one or more fasteners (not shown) through one or more fairing fastener holes 56, as illustrated in FIG. 8. In one or more embodiments, the fairing adjustment member 38 is coupled to the inner fairing member 24 using other coupling means such as integral formation, welding, adhesives, or interference fitting. One of ordinary skill will recognize various coupling and fastening means, and such methods and structures are included in the present disclosure with regard to any coupling operations or structures.

Figure 11:
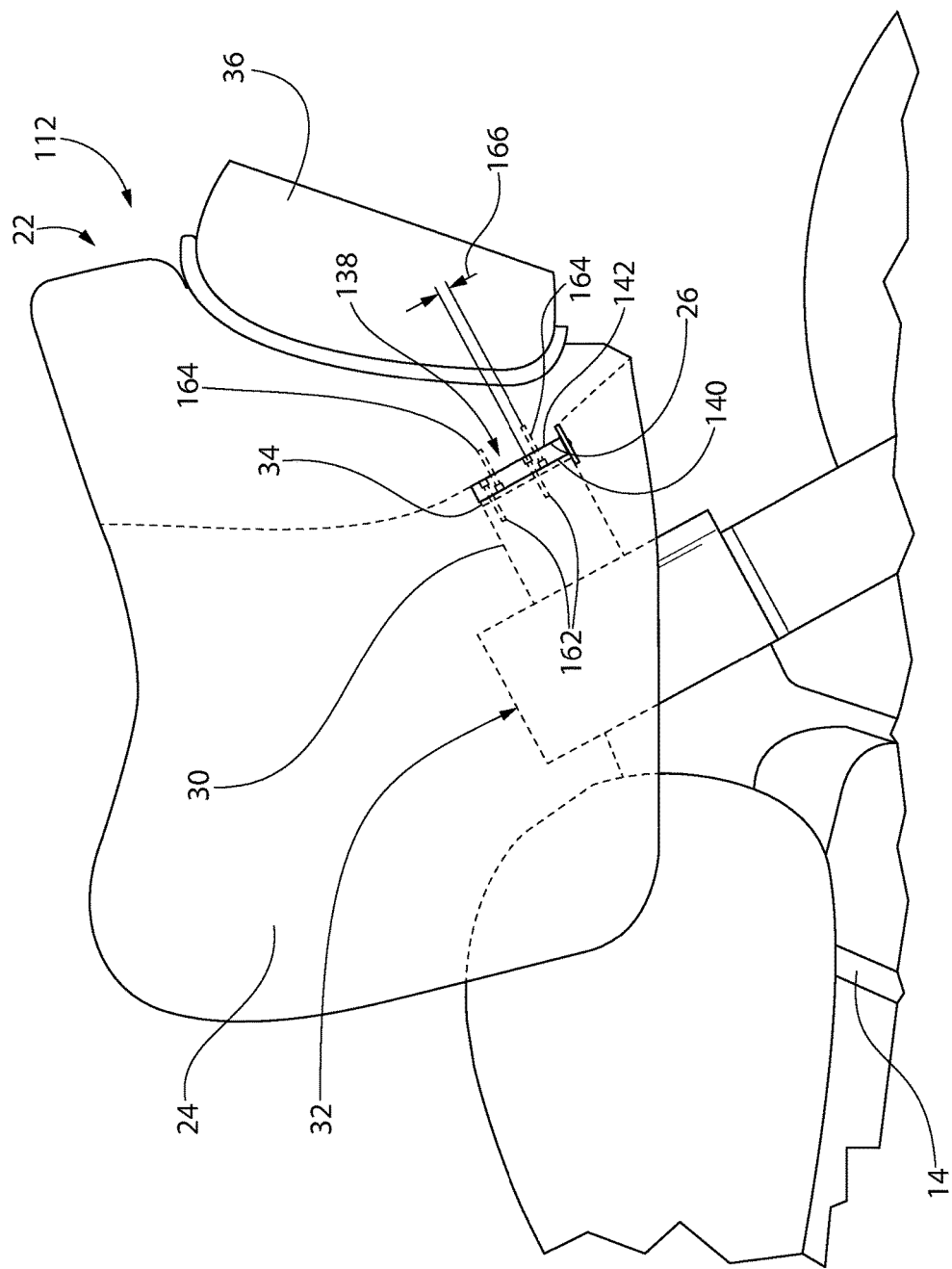
FIG. 11 is a side elevation view of a front portion of a motorcycle having a fairing adjustment assembly in accordance with aspects of the present disclosure.

Reference is now made to FIG. 11, which illustrates a motorcycle fairing adjustment assembly 112 in accordance with particular embodiments of the present disclosure. The assembly 112 includes the fairing bracket 30 extending longitudinally forward from the neck portion 32 of the motorcycle frame 14, the inner fairing member 24 disposed adjacent to the fairing bracket 30, and a fairing adjustment member 138 disposed between the fairing bracket 30 and the inner fairing member 24. The inner fairing member 24 is separated from the fairing bracket 30 by the fairing adjustment member 138 in the illustrated embodiment. By reference, the descriptions, features, and embodiments above and illustrated in FIGS. 1-3 form part of the embodiments illustrated in FIG. 11 and any subsequent FIGs. and descriptions. The motorcycle fairing 22 includes the inner fairing member 24 with the inner fairing member inner surface 26 in the embodiment shown. The motorcycle fairing 22 of an embodiment further includes the outer fairing member 28, as illustrated in FIG. 12.

Figure 12:
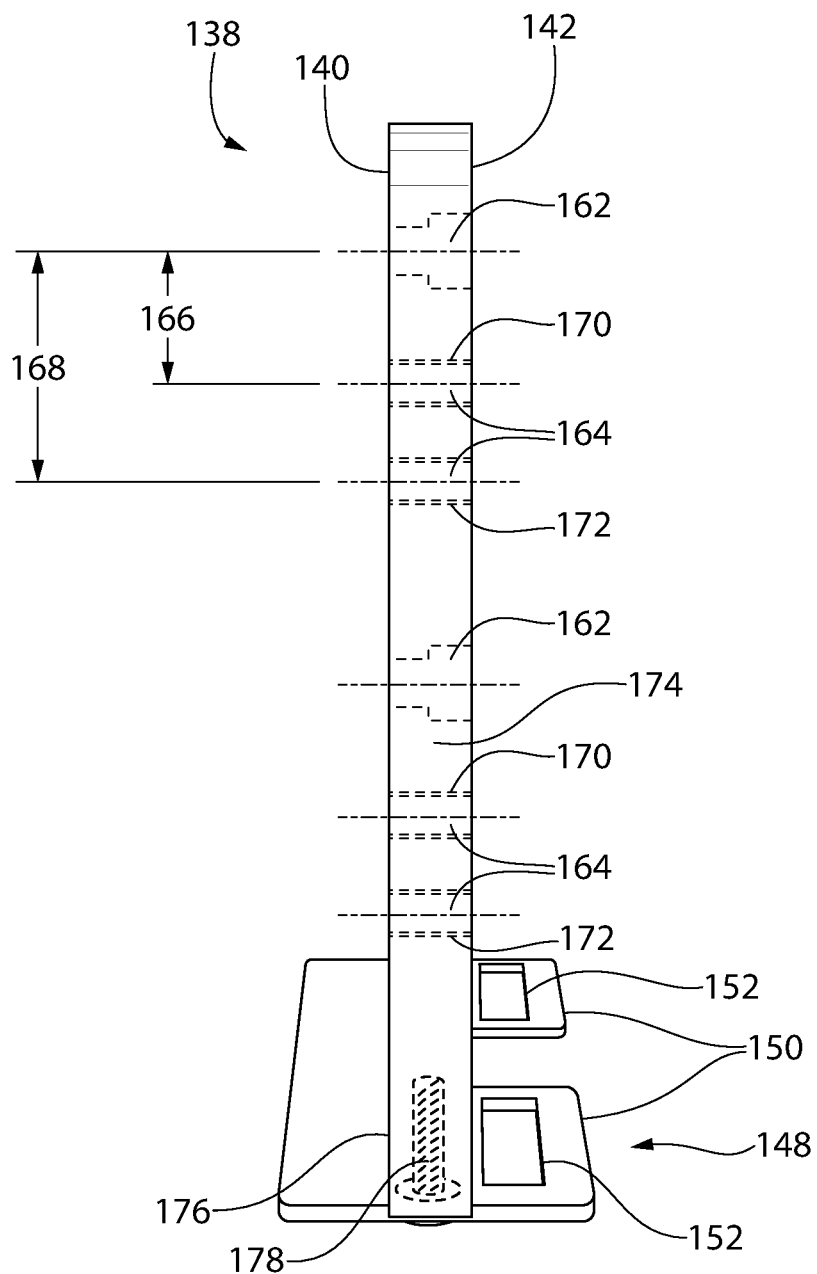
FIG. 12 is an elevation view of a fairing support member in accordance with aspects of the present disclosure.
Figure 13:
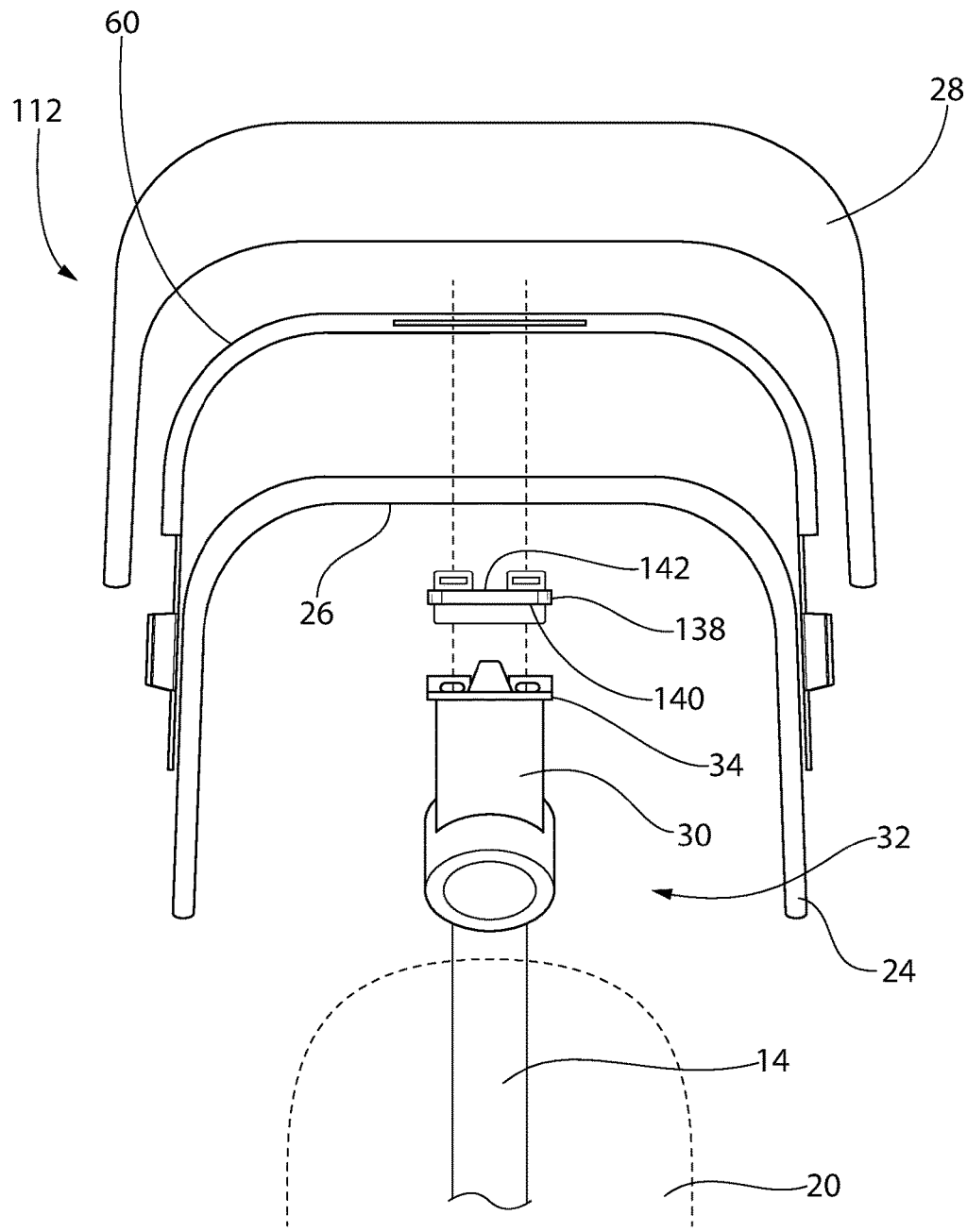
FIG. 13 is a top partially exploded view of a motorcycle having a fairing adjustment assembly in accordance with aspects of the present disclosure.
Figure 14:
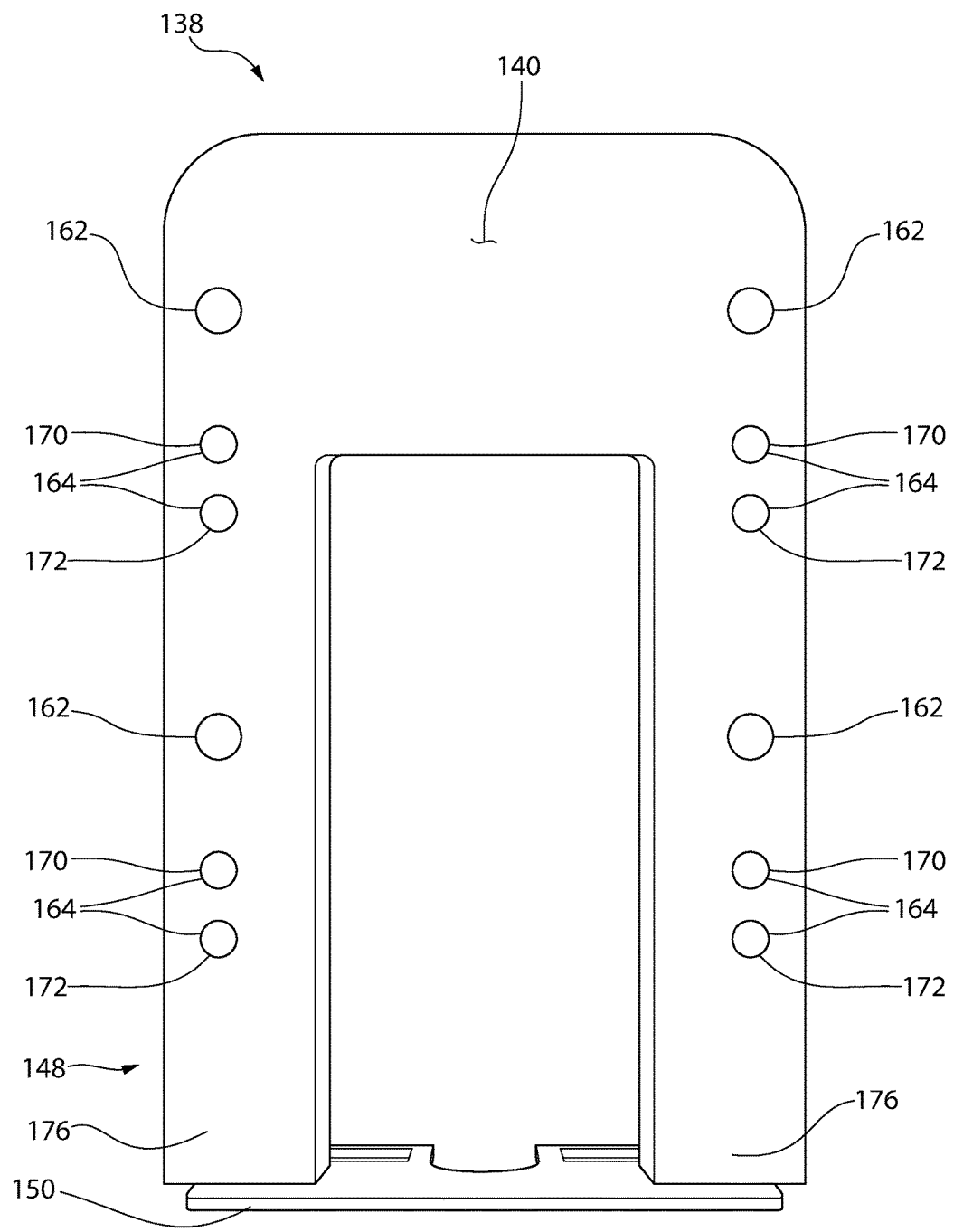
FIG. 14 is an elevation view of a fairing support member in accordance with aspects of the present disclosure.
Figure 15:
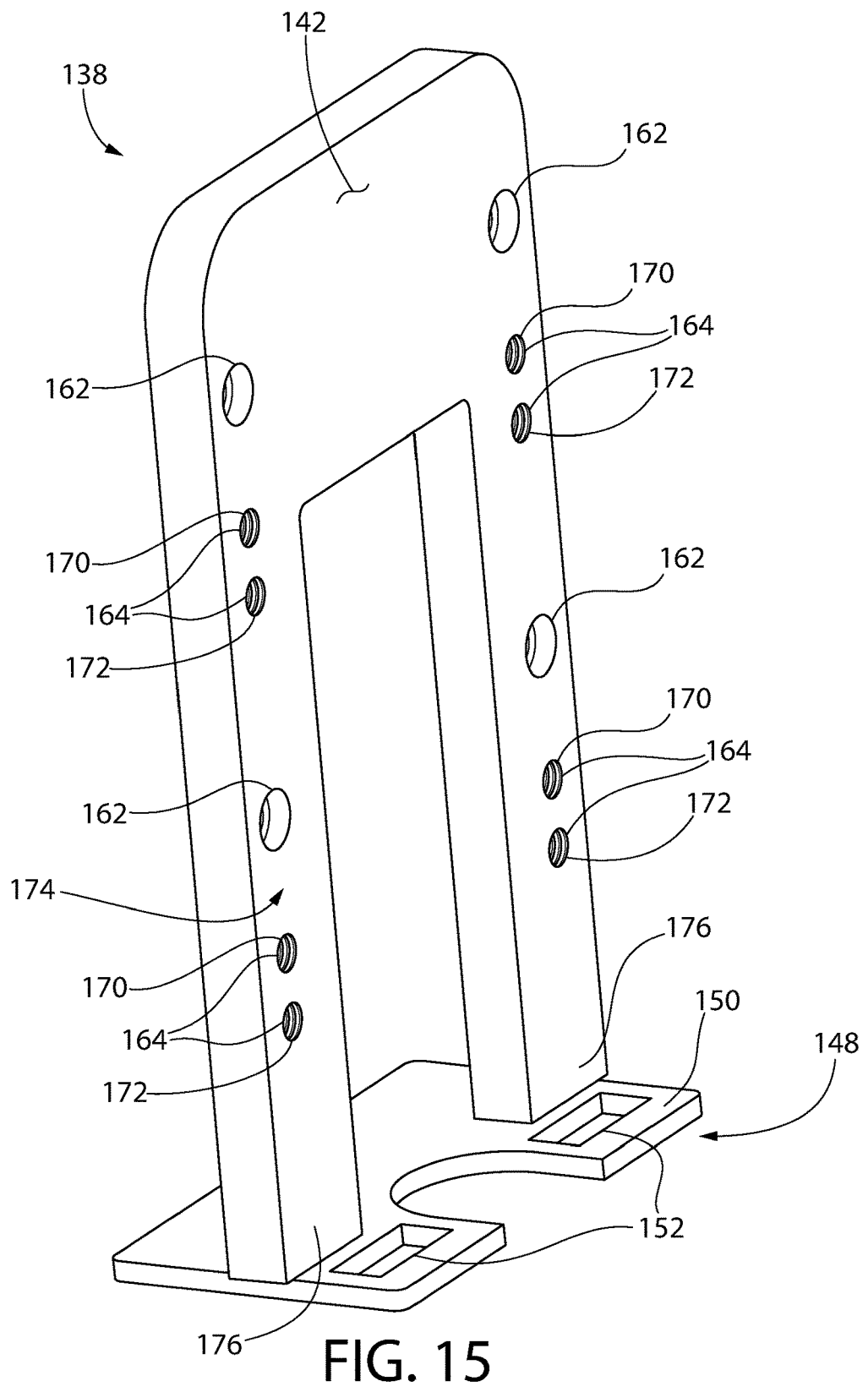
FIG. 15 is a perspective view of a fairing support member in accordance with aspects of the present disclosure.
Figure 16:
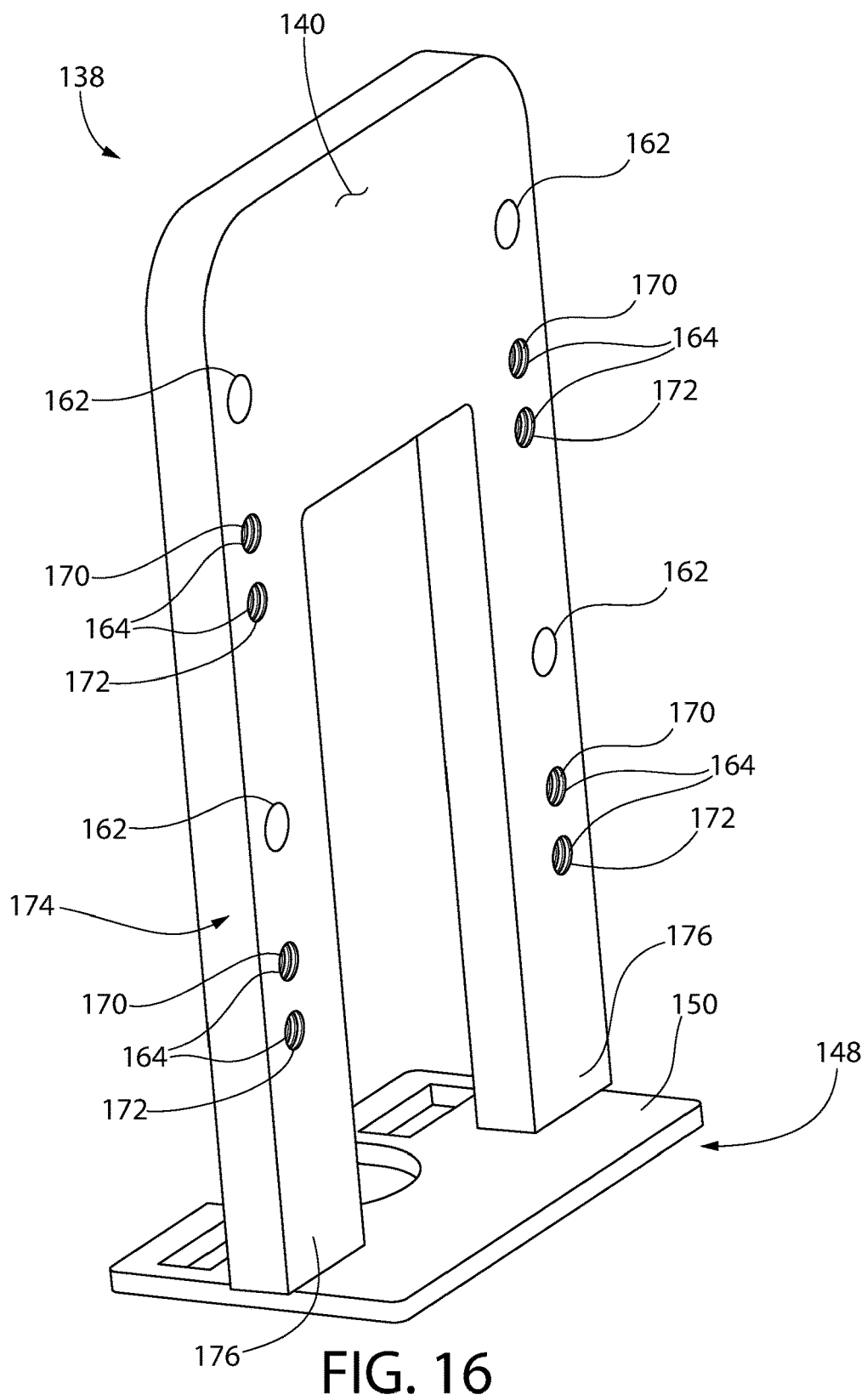
FIG. 16 is a perspective view of a fairing support member in accordance with aspects of the present disclosure.

Referring now to FIG. 12 with continuing reference to FIG. 11, the fairing adjustment member 138 includes an outer side 142 configured for mounting to the inner fairing member 24 and an inner side 140 configured for mounting to the fairing bracket 30 extending longitudinally forward from the neck portion 32 of the motorcycle frame 14. In the embodiment illustrated in FIG. 12, the outer side 142 is substantially parallel with the inner side 140. The outer side 142 is substantially parallel with the inner side 140 in that it is within 5 degrees of the inner side 140 in an embodiment, it is within 3 degrees of the inner side 140 in another embodiment, and it is within one degree of the inner side 140 in an embodiment. In additional embodiments not illustrated, the inner side 140 forms an angle with the outer side 142, including any angle between 0 and 90 degrees, such that the two sides 140, 142 are not parallel. Referring to FIG. 13, the fairing support member 60 forms part of the motorcycle 10 in an embodiment.

The fairing adjustment member 138 further includes at least one first bracket attachment point 162 and at least one fairing attachment point 164 forming an adjustment distance 166 adjusting a vertical position of the inner fairing member 24 relative to the fairing bracket 30. FIG. 11 illustrates the fairing adjustment member 138 being attached to the fairing bracket 30 at the at least one first bracket attachment point 162. The inner fairing member 24 is attached to the fairing adjustment member 138 at the at least one fairing attachment point 164. As illustrated in further detail in FIGS. 12-17, each of the at least one first bracket attachment point 162 and the at least one fairing attachment point 164 is a threaded or unthreaded hole configured to accept a screw, bolt, or other fastener therethrough. One or more of the at least one first bracket attachment point 162 and the at least one fairing attachment point 164 may include a counterbore, such as to accommodate the head of a fastener. However, in one or more embodiments not illustrated, the at least one first bracket attachment point 162 and/or the at least one fairing attachment point 164 may include any other structure or means to attach, fasten, join, or couple the fairing adjustment member 138 to the inner fairing member 24 and/or the fairing bracket 30.

In the embodiments illustrated in FIGS. 12-17, the fairing adjustment member 138 includes a main portion 174 and a lower support portion 148, as identified in FIGS. 14-17. The lower support portion 148 includes at least one support member 150 to provide vertical support for the inner fairing member 24. The at least one support member 150 includes at least one depression 152 configured to position the inner fairing member 24 relative to the fairing bracket 30. In the embodiments illustrated in FIGS. 12-17, two depressions 152 are disposed at the support member 150. The main portion 174 includes four first bracket attachment points 162 and two sets of fairing attachment points 164. Of the two sets of fairing attachment points 164, there are four upper fairing attachment points 170 and four lower fairing attachment points 172. Referring again to FIGS. 11 and 12, the fairing adjustment member 138 is attached to the fairing bracket 30 at the four first bracket attachment points 162, while the fairing adjustment member 138 is attached to the inner fairing member 24 at the fairing attachment points 164. In additional embodiments, there includes any number of first bracket attachment points 162 and/or fairing attachment points 164. In additional embodiments, any sets of the first bracket attachment points 162 are separated by any distance, any sets of the fairing attachment point 164 are separated by any distance, and any sets of the first bracket attachment points 162 and the fairing attachment points 164 are separated by any distance.

The inner fairing member 24 may be coupled to the fairing adjustment member 138 at either the four upper fairing attachment points 170 or the four lower fairing attachment points 172 depending upon the desired vertical positioning of the inner fairing member 24 and any other portion of the motorcycle fairing 22. As illustrated in FIG. 12, the four upper fairing attachment points 170 form the adjustment distance 166 when the inner fairing member 24 is coupled to the fairing adjustment member 138 at the four upper fairing attachment points 170. The four lower fairing attachment points 172 form the adjustment distance 168 when the inner fairing member 24 is coupled to the fairing adjustment member 138 at the four lower fairing attachment points 172. The adjustment distance 168 is a greater distance than the adjustment distance 166, as illustrated in FIG. 12.

Figure 17:
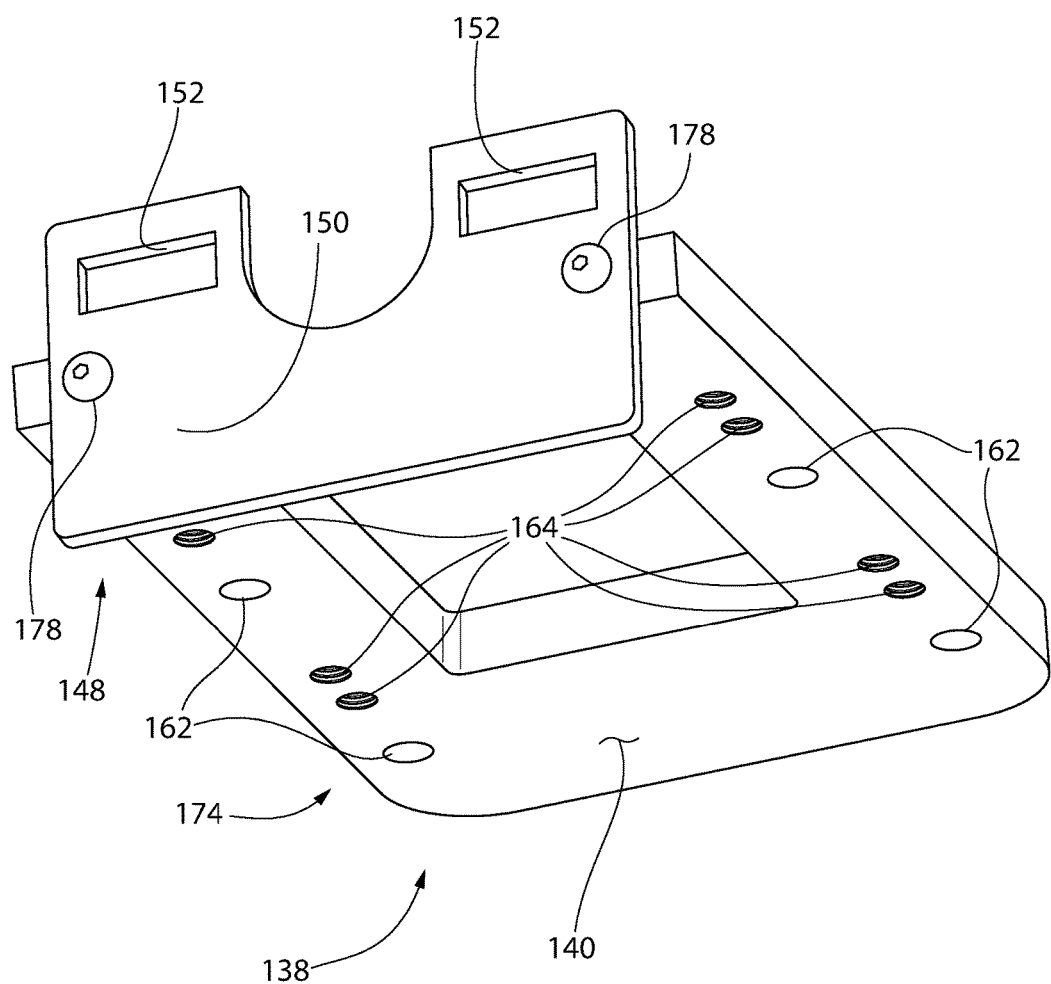
FIG. 17 is bottom perspective view of a fairing support member in accordance with aspects of the present disclosure.

When the inner fairing member 24 is coupled to the fairing adjustment member 138 at the four lower fairing attachment points 172, at least one spacer 176 is disposed between the at least one support member 150 and the main portion 174. In the embodiments illustrated in FIGS. 12-17, two spacers 176 are disposed between the support member 150 and the main portion 174. In one or more embodiments not illustrated, the at least one spacer 176 includes only a single spacer or more than two spacers, and the at least one support member 150 includes more than one support member. As best illustrated in FIG. 17, at least one fastener 178 couples the at least one support member 150 to the main portion 174 and, in the embodiments illustrated, couples the at least one spacer 176 to the at least one support member 150 and/or the main portion 174. The at least one spacer 176 cooperates with the lower fairing attachment points 172 to adjustably vertically position the inner fairing member 24 relative to the fairing bracket 30.

Where the spacer 176 does not form part of the desired application/configuration of the fairing adjustment member 138, such as where the inner fairing member 24 is coupled to the fairing adjustment member 138 at the four upper fairing attachment points 170, the at least one support member 150 is coupled directly to the main portion 174 without the at least one spacer 176 positioned therebetween. One of ordinary skill in the art will recognize that the fairing adjustment member 150 may include any configuration or number of first bracket attachment point(s) 162, fairing attachment point(s) 164, spacer(s) 176, support member(s) 150, depression(s) 152, and/or other features providing various options and/or adjustability for vertical support of the inner fairing member 24, and such configurations and variations form part of the present disclosure.

The present disclosure further provides a method of adjusting the motorcycle fairing 22 and/or the inner fairing member 24. In one embodiment, the method includes removing the inner fairing member 24 from the fairing bracket 30. The method includes coupling the fairing adjustment member 138 to the fairing bracket 30 at the at least one first bracket attachment point 162 and coupling the inner fairing member 24 to the fairing adjustment member 138 at the at least one fairing attachment point 164 such that the adjustment distance 166/168 is formed by the at least one first bracket attachment point 162 and the at least one fairing attachment point 164 corresponding to a vertical adjustment of the inner fairing member 24 relative to the fairing bracket 30.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

I claim:

1. A motorcycle fairing adjustment assembly comprising:
a fairing bracket extending longitudinally forward from a neck portion of a motorcycle frame;
an inner fairing member disposed adjacent to the fairing bracket; and
a fairing adjustment member disposed between the fairing bracket and the inner fairing member, wherein the fairing adjustment member comprises at least one first bracket attachment point and at least one fairing attachment point forming an adjustment distance adjusting a vertical position of the inner fairing member relative to the fairing bracket, and wherein the fairing adjustment member is attached to the fairing bracket at the at least one first bracket attachment point, and wherein the inner fairing member is attached to the fairing adjustment member at the at least one fairing attachment point the fairing adjustment member comprises at least one second fairing attachment point forming a second adjustment distance between the at least one first bracket attachment point, the second adjustment distance adjusting the vertical position of the inner fairing member relative to the fairing bracket.

2. The assembly of claim 1, wherein the fairing adjustment member further comprises a lower support portion providing vertical support for the inner fairing member.

3. The assembly of claim 2, wherein the lower support portion comprises at least one support member to provide vertical support for the inner fairing member.

4. The assembly of claim 3, wherein the fairing adjustment member further comprises a main portion, and the lower support portion further comprises at least one spacer disposed between the at least one support member and the main portion.

5. The assembly of claim 4, wherein the at least one fairing attachment point includes at least one upper fairing attachment point and at least one lower fairing attachment point, the at least one spacer cooperating with the at least one lower fairing attachment point to adjustably vertically position the inner fairing member relative to the fairing bracket.

6. The assembly of claim 1, wherein the fairing adjustment member includes an outer side configured for mounting to the inner fairing member and an inner side configured for mounting to the fairing bracket, the outer side being substantially parallel with the inner side.

7. A motorcycle fairing adjustment member comprising:
an outer side configured for mounting to an inner fairing member of a motorcycle;
an inner side configured for mounting to a fairing bracket extending longitudinally forward from a neck portion of a motorcycle frame;

at least one first bracket attachment point configured for attachment of the fairing adjustment member to the fairing bracket;

at least one fairing attachment point configured for attachment of the inner fairing member of the motorcycle to the fairing adjustment member;

an adjustment distance formed by the at least one first bracket attachment point and the at least one fairing attachment point, wherein the adjustment distance adjusts a vertical position of the inner fairing member relative to the fairing bracket; and a lower support portion configured to vertically support the inner fairing member.

8. The motorcycle fairing adjustment member of claim 7, wherein the lower support portion comprises at least one support member configured to vertically support the inner fairing member.

9. The motorcycle fairing adjustment member of claim 8, wherein the at least one support member comprises at least one depression configured to position the inner fairing member relative to the fairing bracket.

10. The motorcycle fairing adjustment member of claim 8, wherein the fairing adjustment member further comprises a main portion, and the lower support portion further comprises at least one spacer disposed between the at least one support member and the main portion.

11. The motorcycle fairing adjustment member of claim 10, wherein the at least one fairing attachment point includes at least one upper fairing attachment point and at least one lower fairing attachment point, the at least one spacer and the at least one lower fairing attachment point cooperatively configured to adjustably vertically position the inner fairing member relative to the fairing bracket.

12. A method of adjusting a motorcycle fairing comprising:

providing a fairing adjustment member comprising at least one first bracket attachment point and at least one fairing attachment point forming an adjustment distance;

providing a fairing bracket having a fairing bracket outer surface and extending longitudinally forward from a neck portion of a motorcycle frame;

providing an inner fairing member having an inner fairing member inner surface;

coupling the fairing adjustment member to the fairing bracket at the at least one first bracket attachment point;

coupling the inner fairing member to the fairing adjustment member at the at least one fairing attachment point such that an adjustment distance is formed by the at least one first bracket attachment point and the at least one fairing attachment point corresponding to a vertical adjustment of the inner fairing member relative to the fairing bracket; and vertically supporting the inner fairing member with a lower support portion of the fairing adjustment member.

13. The method of claim 12, further comprising vertically supporting the inner fairing member with at least one support member at the lower support portion.

14. The method of claim 13, further comprising adjusting a vertical position of the at least one support member with a spacer disposed between a main portion of the fairing adjustment member and the at least one support member.

15. The method of claim 13, further comprising positioning the inner fairing member relative to the fairing adjustment member with at least one depression in the at least one support member.

16. The method of claim 12, further comprising removing the inner fairing member from the fairing bracket before coupling the fairing adjustment member to the fairing bracket at the at least one first bracket attachment point and before coupling the inner fairing member to the fairing adjustment member at the at least one fairing attachment point.

* * * * *